US009367078B2

(12) United States Patent
Poornachandran et al.

(10) Patent No.: US 9,367,078 B2
(45) Date of Patent: Jun. 14, 2016

(54) MODIFICATION OF INDICATORS CORRESPONDING TO ALERTS

(71) Applicant: INTEL CORPORATION, Santa Clara, CA (US)

(72) Inventors: Rajesh Poornachandran, Portland, OR (US); Brian Vogel, Santa Clara, CA (US); Francis Tharappel, Portland, OR (US); Lakshman Krishnamurthy, Portland, OR (US)

(73) Assignee: Intel Corporation, Santa Clara, CA (US)

( * ) Notice: Subject to any disclaimer, the term of this patent is extended or adjusted under 35 U.S.C. 154(b) by 63 days.

(21) Appl. No.: 14/040,272

(22) Filed: Sep. 27, 2013

(65) Prior Publication Data

US 2015/0091712 A1    Apr. 2, 2015

(51) Int. Cl.
*H04B 3/36* (2006.01)
*G06F 1/00* (2006.01)
*G06F 1/16* (2006.01)

(52) U.S. Cl.
CPC .............. *G06F 1/00* (2013.01); *G06F 1/1688* (2013.01)

(58) Field of Classification Search
CPC ..... G08B 23/00; G08B 25/016; H04M 19/04; H04M 19/047; H04M 2250/12
See application file for complete search history.

(56) References Cited

U.S. PATENT DOCUMENTS

| | | | |
|---|---|---|---|
| 8,552,859 B2 * | 10/2013 | Pakula et al. | 340/540 |
| 2008/0036591 A1 * | 2/2008 | Ray | 340/540 |
| 2008/0132196 A1 * | 6/2008 | Soh et al. | 455/404.1 |
| 2009/0010442 A1 * | 1/2009 | Usher et al. | 381/57 |
| 2009/0167542 A1 * | 7/2009 | Culbert et al. | 340/635 |
| 2012/0302162 A1 * | 11/2012 | Chueh et al. | 455/39 |
| 2014/0070943 A1 * | 3/2014 | Breed | 340/539.11 |
| 2014/0156829 A1 * | 6/2014 | Lee et al. | 709/224 |
| 2014/0351098 A1 * | 11/2014 | Shafer et al. | 705/28 |

* cited by examiner

*Primary Examiner* — Kerri McNally
*Assistant Examiner* — Renee Dorsey
(74) *Attorney, Agent, or Firm* — International IP Law Group, P.L.L.C.

(57) ABSTRACT

Various methods and systems for modifying an indicator corresponding to an alert are described herein. One example method includes detecting an alert with a computing device. The method also includes monitoring a noise level in an environment surrounding a computing device. In addition, the method includes modifying the indicator corresponding to the alert based on the noise level. Furthermore, the method includes providing the modified indicator corresponding to the alert.

24 Claims, 5 Drawing Sheets

MODIFICATION OF INDICATORS CORRESPONDING TO ALERTS

BACKGROUND

1. Field

This disclosure relates generally to indicators, and more specifically, but not exclusively, to indicators corresponding to alerts.

2. Description

Many computing devices can provide indicators to users that a computing device has received an alert. For example, a computing device may receive an alert indicating an incoming email message, or text message, among others. Additionally, many computing devices may be mobile devices that can receive alerts corresponding to incoming phone calls, or incoming data for applications, among others. In response to receiving an alert, computing devices can provide indicators such as audio feedback, or haptic feedback.

BRIEF DESCRIPTION OF THE DRAWINGS

The following detailed description may be better understood by referencing the accompanying drawings, which contain specific examples of numerous features of the disclosed subject matter.

DESCRIPTION OF THE EMBODIMENTS

According to embodiments of the subject matter discussed herein, a computing device can modify an indicator corresponding to an alert. An alert, as referred to herein, can include a notification of an incoming phone call, a notification related to an application, an incoming text message, a media file, a video, or an email message, among others. An indicator, as referred to herein, can include audio feedback, haptic feedback, or any suitable combination thereof. In some embodiments, a computing device can adapt the indicator based on the noise level. For example, a computing device may detect the noise level in the environment surrounding the computing device to determine a modification to apply to the indicator. In some examples, the computing device can reduce the amount of audio feedback in response to detecting a low noise level in the surrounding environment. The computing device may also provide haptic feedback rather than audio feedback in response to detecting a low noise level. In some embodiments, the noise level is not continuously sampled. Rather, the computing device can monitor the surrounding environment for the noise level in response to detecting an alert.

Reference in the specification to "one embodiment" or "an embodiment" of the disclosed subject matter means that a particular feature, structure, or characteristic described in connection with the embodiment is included in at least one embodiment of the disclosed subject matter. Thus, the phrase "in one embodiment" may appear in various places throughout the specification, but the phrase may not necessarily refer to the same embodiment.

Figure 1:
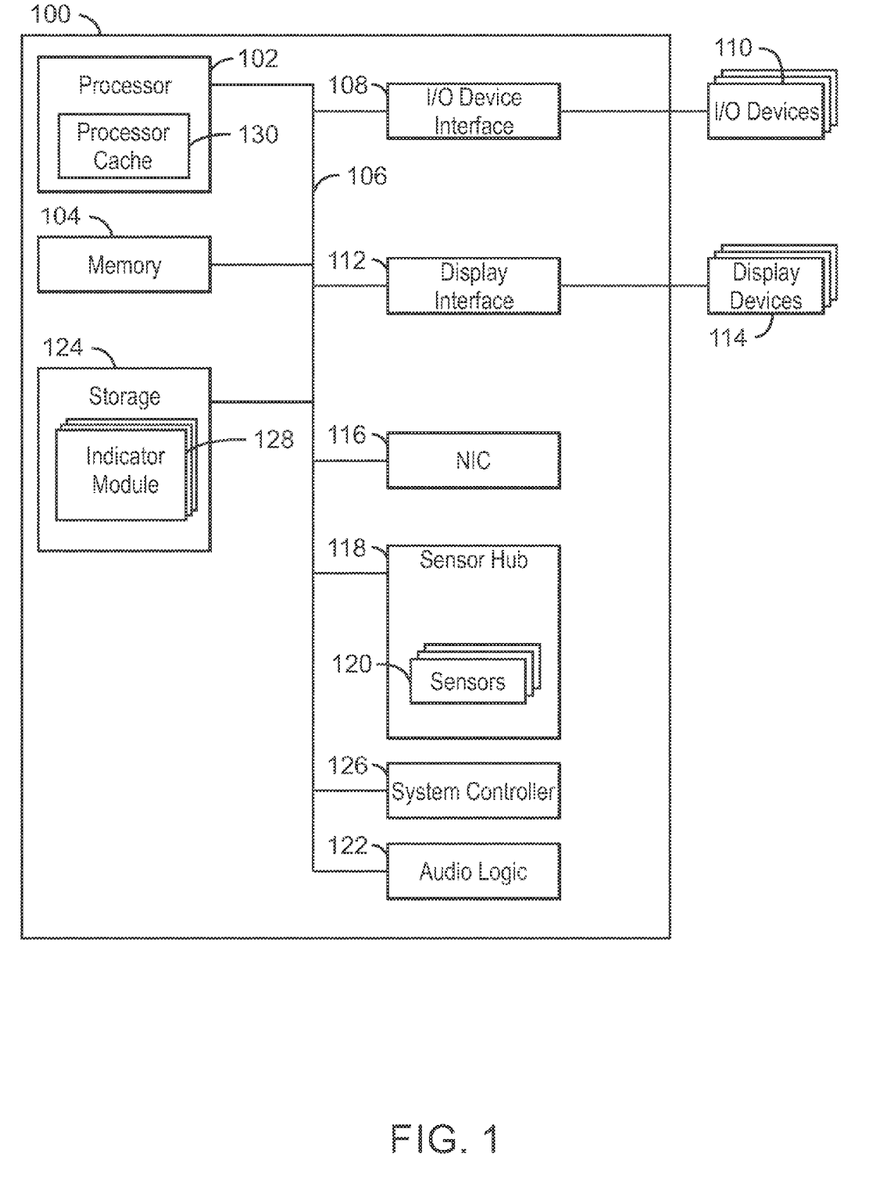
FIG. 1 is a block diagram of an example of a computing system that can modify indicators corresponding to alerts.

FIG. 1 is a block diagram of an example of a computing system that can modify indicators corresponding to alerts. The computing device 100 may be, for example, a computing phone, laptop computer, desktop computer, or tablet computer, among others. The computing device 100 may include a processor 102 that is adapted to execute stored instructions, as well as a memory device 104 that stores instructions that are executable by the processor 102. The processor 102 can be a single core processor, a multi-core processor, a computing cluster, or any number of other configurations. The memory device 104 can include random access memory, read only memory, flash memory, or any other suitable memory systems. The instructions that are executed by the processor 102 may be used to implement a method that can modify an indicator corresponding to an alert.

The processor 102 may be connected through a system interconnect 106 (e.g., PCI®, PCI-Express®, etc.) to an input/output (I/O) device interface 108 adapted to connect the computing device 100 to one or more I/O devices 110. The I/O devices 110 may include, for example, a keyboard and a pointing device, wherein the pointing device may include a touchpad or a touchscreen, among others. The I/O devices 110 may be built-in components of the computing device 100, or may be devices that are externally connected to the computing device 100.

The processor 102 may also be linked through the system interconnect 106 to a display interface 112 adapted to connect the computing device 100 to a display device 114. The display device 114 may include a display screen that is a built-in component of the computing device 100. The display device 114 may also include a computer monitor, television, or projector, among others, that is externally connected to the computing device 100. In addition, a network interface controller (also referred to herein as a NIC) 116 may be adapted to connect the computing device 100 through the system interconnect 106 to a network (not depicted). The network (not depicted) may be a cellular network, a radio network, a wide area network (WAN), a local area network (LAN), or the Internet, among others.

The processor 102 may also be linked through the system interconnect 106 to a sensor hub 118 that includes any suitable number of sensors 120. For example, the sensors 120 may include an accelerometer, a magnetometer, a gyroscope, a proximity sensor, and a GPS sensor, among others. In some embodiments, the sensors 120 can detect the location of a computing device 100 or detect if a computing device 100 is in motion. In some examples, a computing device can provide power to any suitable number of hardware components based on the location of a computing device 100 or if a computing device 100 is in motion. For example, a computing device 100 may enter a sleep state in which the power is reduced or halted to any suitable number of hardware components. The sensor hub 118 may also use data collected from sensors 120 to determine how frequently to sample a noise level in the environment surrounding the computing device 100.

The processor 102 may also be linked through the system interconnect 106 to audio logic 122. In some embodiments, the audio logic 122 can detect a noise level in the environment surrounding the computing device 100 by monitoring an input device 110 such as a microphone. The noise level, as referred to herein, can include any suitable measurement of the sound waves propagating through the environment surrounding a computing device 100. For example, the noise level may be represented with any suitable number of decibels that indicates the amount of sound waves near a computing device 100. In some examples, the audio logic 122 may store the noise level in memory 104 or storage 124. In some embodiments, the processor 102 may also be linked through the system interconnect 106 to a system controller 126. The system controller 126 can monitor the audio logic 122 and perform actions in response to the noise level detected by the audio logic 122. For example, the system controller 126 may enter a sleep state and alter the amount of power provided power to any suitable number of hardware components such as a processor 102 or memory device 104 in response to a change in the noise level.

The processor 102 may also be linked through the system interconnect 106 to a storage device 124 that can include a hard drive, an optical drive, a USB flash drive, an array of drives, or any combinations thereof. The storage device 124 may include an indicator module 128 that can determine whether to modify an indicator corresponding to an alert. For example, the indicator module 128 can determine that the noise level for the environment surrounding the computing device 100 has changed. In response to a different noise level, the indicator module 128 can modify an indicator for an alert. For example, the indicator module 128 may determine that the noise level has decreased. Therefore, the indicator module 128 may decrease a volume level of the indicator for an alert. In some examples, the indicator module 128 may also reduce the amount of haptic feedback, among others. Similarly, the indicator module 128 may also increase the audio feedback or haptic feedback, among others, in response to detecting an increased noise level. In some embodiments, the indicator module 128 can be loaded into processor cache 130 in the processor 102. The processor cache 130 can store the indicator module 128 as the processor 102 executes the instructions of the indicator module 128.

In some embodiments, the indicator module 128 may delay providing an indicator corresponding to an alert until the indicator module 128 determines the noise level. For example, the indicator module 128 may detect an alert such as an incoming phone call, notification, text message, or email, among others. The indicator module 128 may also monitor the noise level for a predetermined period of time before modifying the indicator based on the noise level. In some examples, the indicator module 128 can provide the modified indicator rather than the indicator.

It is to be understood that the block diagram of FIG. 1 is not intended to indicate that the computing device 100 is to include all of the components shown in FIG. 1. Rather, the computing device 100 can include fewer or additional components not illustrated in FIG. 1 (e.g., additional memory components, embedded controllers, additional modules, additional network interfaces, at least one noise level monitoring device, etc.). Furthermore, any of the functionalities of the indicator module 128 may be partially, or entirely, implemented in hardware and/or in the processor 102. For example, the functionality may be implemented with an application specific integrated circuit, in the logic implemented in an I/O device 110, or logic implemented in an embedded controller, among others. In some embodiments, the functionalities of the indicator module 128 can be implemented with processing logic, wherein the processing logic, as referred to herein, can include any suitable hardware (e.g., a processor, among others), software (e.g., an application, among others), firmware, or any suitable combination of hardware, software, and firmware.

Figure 2:
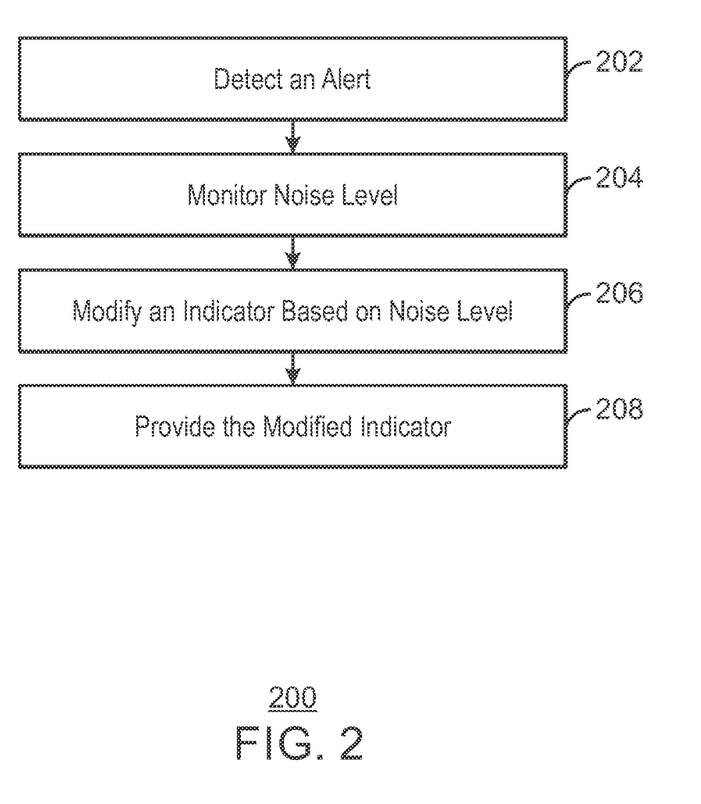
FIG. 2 is a process flow diagram of an example method for modifying indicators corresponding to alerts.

FIG. 2 is a process flow diagram of an example method for modifying indicators for alerts. The method 200 can be implemented with any suitable computing device, such as the computing device 100 of FIG. 1.

At block 202, the indicator module 128 can detect an alert with a computing device. As discussed above, an alert can include a notification of an email, a notification related to an application, a text message, or an incoming phone call, among others. In some examples, the indicator module 128 may detect the alert from an incoming packet received by a network interface card, an input device, or any other suitable hardware component using any suitable transmission protocol.

At block 204, the indicator module 128 can monitor a noise level in an environment surrounding the computing device. In some embodiments, the indicator module 128 can detect the noise level from an input device or at least one noise level monitoring device such as a microphone, a sensor, or any suitable combination. In some examples, the indicator module 128 can monitor the noise level for a predetermined period of time if an alert is received. For example, the indicator module 128 may monitor the noise level of the surrounding environment of a computing device for a second, a minute, an hour, or any other suitable period of time. In some embodiments, the indicator module 128 can also monitor the noise level based on a sampling time interval that is discussed in greater detail below in relation to FIG. 3.

At block 206, the indicator module 128 can modify the indicator corresponding to the alert based on the noise level. In some embodiments, the indicator can include any combination of audio feedback and/or haptic feedback. In some examples, the indicator module 128 can reduce the volume of audio feedback or haptic feedback in response to detecting a low noise level. The indicator module 128 can also increase the volume of audio or haptic feedback in response to detecting a high noise level.

At block 208, the indicator module 128 can provide the modified indicator corresponding to an alert. For example, the indicator module 128 may provide audio feedback, haptic feedback, or any combination thereof to indicate to a user that a computing device has received an alert. In some embodiments, the modified indicator corresponding to an alert can prevent the indicator module 128 from providing a loud indicator in a quiet environment or a soft indicator in a loud environment.

The process flow diagram of FIG. 2 is not intended to indicate that the operations of the method 200 are to be executed in any particular order, or that all of the operations of the method 200 are to be included in every case. Additionally, the method 200 can include any suitable number of additional operations. For example, the indicator module 128 may also periodically monitor the noise level based on predefined sampling time intervals, which are discussed in greater detail below in relation to FIG. 3.

Furthermore, in some embodiments, the indicator module 128 can also transition from a sleep state to a wake state in order to provide the modified indicator corresponding to an alert. A sleep state, as referred to herein, can include a state in which a computing device does not provide power to all hardware components of the computing device. A wake state, as referred to herein, can include a state in which a computing device provides power to hardware components that do not receive power in a sleep state. In some examples, a computing device may enter a low power mode (also referred to herein as a sleep state) when the number of instructions executed by the processor of the computing device is below a threshold. For example, a computing device may stop the flow of power to any suitable number of hardware components in a sleep state. In some examples, the computing device can stop the flow of power to hardware components except for a sensor and audio logic. The sensor may detect that the operating conditions of the computing device have changed and indicate power is to be provided to additional hardware components. For example, a sensor may detect that the computing device is in motion, that the location of the computing device has changed, or that the ambient light surrounding the computing device has changed, among others. In response to detecting a change in the operating conditions of the computing device, the computing device may provide power to the processor, memory devices, and any additional number of hardware devices. In some embodiments, the audio logic can periodically receive power to monitor the noise level of the environment surrounding the computing device. The audio logic may also store the noise level in a memory device. The indicator module 128 can use the stored noise level to modify an indicator when an alert is received.

Figure 3:
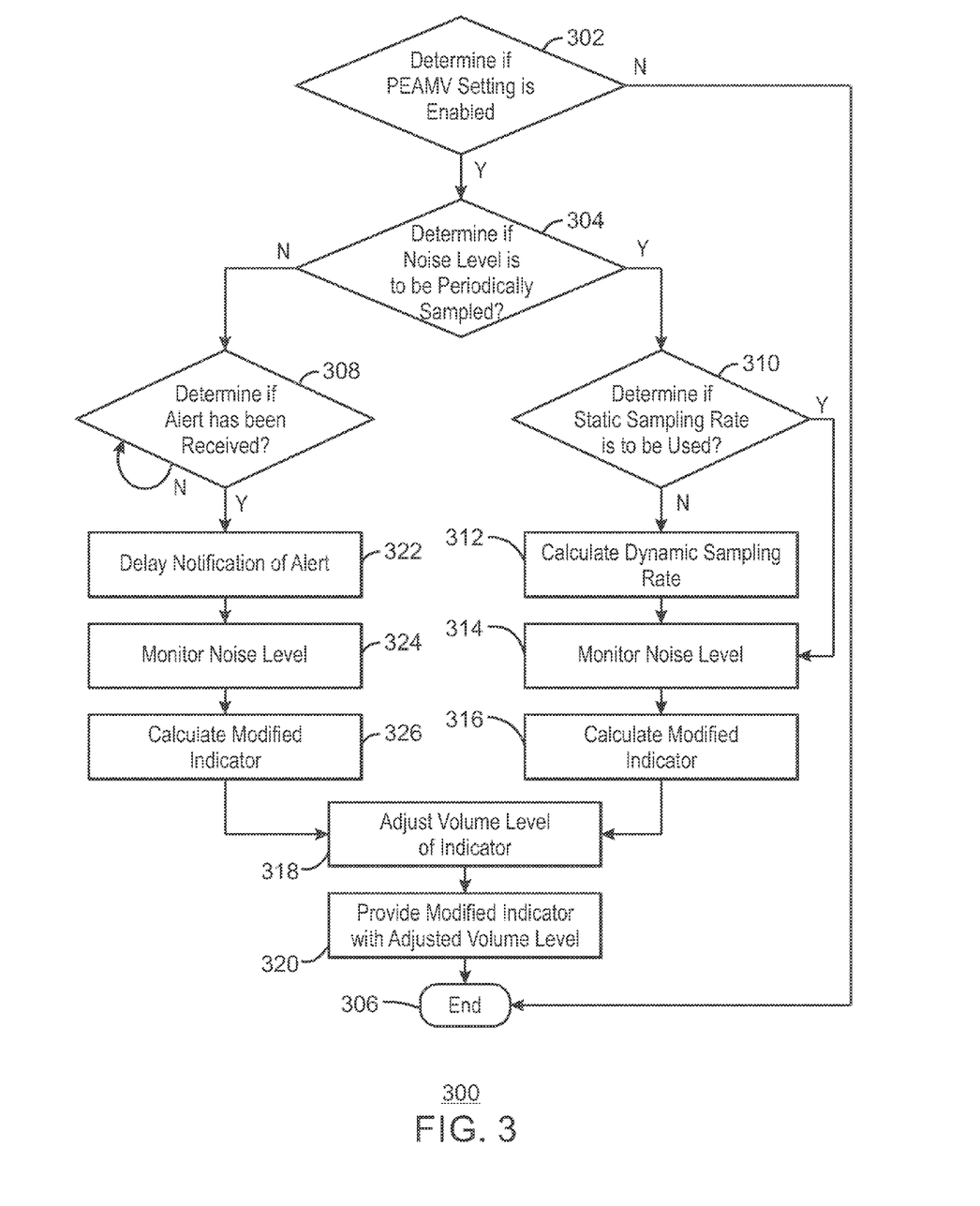
FIG. 3 is a process flow diagram of an example method for modifying indicators corresponding to alerts.

FIG. 3 is a process flow diagram of an example method for modifying indicators for alerts. The method 300 can be performed with any suitable computing device, such as the computing device 100 of FIG. 1.

At block 302, the indicator module 128 can determine if the power efficient adaptive media volume (also referred to herein as PEAMV) settings are enabled. The PEAMV settings can indicate whether an indicator module 128 can dynamically adjust an indicator corresponding to an alert. If the PEAMV setting is enabled, the process flow continues at block 304. If the PEAMV setting is not enabled, the indicator module 128 may not modify an indicator corresponding to an alert and the process flow ends at block 306. In some examples, if the PEAMV setting is not enabled, the indicator can be modified manually through user settings.

At block 304, the indicator module 128 can determine if the noise level of an environment of a computing device is to be periodically sampled. For example, the indicator module 128 may determine time intervals during which the indicator module 128 is to monitor or sample the noise level of the environment surrounding a computing device. Alternatively, the indicator module 128 may not monitor the noise level periodically. Rather, the indicator module 128 may monitor the noise level for a predetermined period of time in response to receiving an alert. If the indicator module 128 is not to periodically sample the noise level, the process flow continues at block 308. If the indicator module 128 is to periodically sample the noise level, the process continues at block 310.

At block 310, the indicator module 128 can determine if a static sampling rate is to be used to sample or monitor the noise level. A static sampling rate, as referred to herein, includes a predetermined fixed time interval between the monitoring of noise levels. If the indicator module 128 is not to use a static sampling rate to monitor the noise level, the process flow continues at block 312. If the indicator module 128 is to use a static sampling rate to monitor the noise level, the process flow continues at block 314.

At block 312, the indicator module 128 calculates a dynamic sampling rate. A dynamic sampling rate, as referred to herein, includes any suitable period of time between monitoring for noise levels. In some embodiments, the dynamic sampling rate can be determined using any suitable calculation. For example, the indicator module 128 may store a detected noise level along with the time that the noise level was detected. In some examples, the indicator module 128 can also determine a mean noise level based on previous noise levels. For example, the indicator module 128 may determine a mean noise level based on noise levels detected within a time frame. In some examples, the indicator module 128 may determine a mean noise level based on noise levels detected within five minutes of 12:00 PM over any suitable number of previous days. In some embodiments, the indicator module 128 can also calculate a weighted mean value by applying a weight to some noise level values. The weighted mean value may include weights that are larger for noise levels close to a time value.

In some embodiments, the indicator module 128 can use the mean noise level or weighted mean value in any suitable number of equations to determine the dynamic sampling rate. For example, multiple mean noise levels or weighted mean values can be used to produce a noise level curve (also referred to herein as h(t)). In Equation 1 below, the absolute value of the slope of the noise level curve can be multiplied by a normalization factor (also referred to herein as gamma) to produce a value between zero and one (also referred to herein as G(t)).

$$G(t) = \text{gamma} * \text{abs}(dh(t)/dt) \qquad \text{Eq(1)}$$

The indicator module 128 may also use the value of G(t) to determine when the noise level is not to be monitored. In some embodiments, the indicator module 128 can enable the transition from a wake state to a sleep state when the noise level is not to be monitored. The Equation 2 listed below, can calculate the frequency at which the noise level is to be monitored:

$$\text{Dynamic Sampling Rate} = \text{beta\_0} + (\text{beta\_1} - \text{beta\_0}) * g(t) \qquad \text{Eq(2)}$$

In Eq(2), beta_0 can be a value that represents the maximum amount of time between monitoring the noise level. Beta_1 can be a value that represents a minimum amount of time between monitoring the noise level. The indicator module 128 can use the dynamic sampling rate to determine when to monitor the noise level and when to indicate that hardware components are to transition from a wake state to a sleep state.

At block 314, the indicator module 128 can monitor the noise level based on a static sampling rate or a dynamic sampling rate. In some embodiments, the indicator module 128 can use the dynamic sampling rate calculated at block 312 to determine when to sample the noise level. For example, the indicator module 128 may use the dynamic sampling rate to indicate that an input device and audio logic are to receive power and monitor the noise level. In some examples, the input device and audio logic can monitor the noise level when the probability of a change in the noise level has increased. Alternatively, the indicator module 128 can also monitor the noise level using a static sampling rate. For example, the indicator module 128 may monitor the noise level during predetermined periods of time separated by fixed intervals.

At block 316, the indicator module 128 can calculate a modified indicator. In some examples, the indicator module 128 can calculate the modified indicator based on an increase or a decrease in the noise level. For example, the indicator module 128 can increase or decrease the volume of the indicator or the amount of haptic feedback in response to a change in a noise level. As discussed above, the modified indicator may be softer in environments with a low noise level and louder in environments with a higher noise level.

At block 318, the indicator module 128 can adjust the volume level of the indicator based on the modified indicator. For example, a volume level associated with the indicator may be increased or decreased. In some embodiments, the indicator can correspond to any suitable alert such as a media file, an alarm, a phone call, a user initiated media application or a ringer notification, among others. At block 320, the modified indicator can be provided to a user in response to an alert being received by the indicator module 128.

If the indicator module 128 determines that the noise level of an environment of a computing device is not to be periodically sampled at block 304, the process flow continues at block 308. At block 308, the indicator module 128 can determine if an alert has been received. As discussed above, an alert can include a notification of a text message, an email message, an incoming phone call, movement of the computing device, or any suitable selections of buttons in an input device, among others. In some embodiments, the alert can indicate that the computing device is to transition from a sleep state to a wake state. A sleep state can include a state during which a computing device does not provide power to any suitable number of hardware components. For example, a computing device may not provide power to a processor, interfaces with input/output devices, graphics devices, display devices, sensors, communication modules, or memory devices, among others. In some examples, a wake state can include providing power to any suitable number of hardware components that do not receive power in a sleep state. For example, a computing device may provide power to a processor, any suitable interface, or memory devices, among others, in response to transitioning from a sleep state to a wake state. If an alert has not been received, the process flow continues at block 308. If an alert has been received, the process flow continues at block 322.

At block 322, the indicator module 128 can delay notifying a processor that an alert has been received. For example, the indicator module 128 may not provide an indicator corresponding to an alert until the noise level has been monitored and adjusted for sophisticated user experience. At block 324, the indicator module 128 can monitor the noise level. In some embodiments, the indicator module 128 can provide power to audio logic and an input device, which can detect the noise level. The indicator module 128 may monitor the noise level using any suitable input device such as a microphone for a predetermined period of time.

At block 326, the indicator module 128 can calculate a modified indicator based on the monitored noise level. As discussed above, the modified indicator may be softer in environments with a low noise level and louder in environments with a higher noise level. In some embodiments, the indicator may not be modified if the noise level has not changed. The process flow continues at block 318.

The process flow diagram of FIG. 3 is not intended to indicate that the operations of the method 300 are to be executed in any particular order, or that all of the operations of the method 300 are to be included in every case. Additionally, the method 300 can include any suitable number of additional operations.

Figure 4:
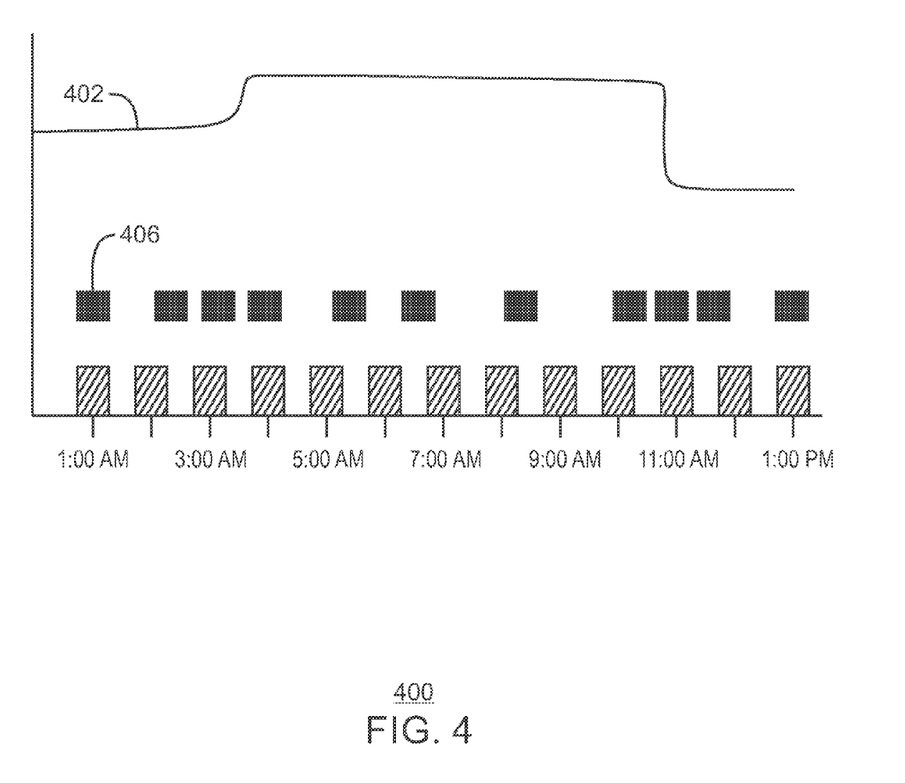
FIG. 4 is an example chart illustrating sampling techniques used for modifying indicators that correspond to alerts.

FIG. 4 is an example chart illustrating sampling techniques used for modifying indicators corresponding to alerts. In the chart 400, the solid line 402 represents the noise level at various periods of time. For example, the noise level increases at the time interval marked 4:00 AM and decreases at the time interval marked 11:00 AM. In other examples, the noise level may increase and decrease by any suitable amount at any suitable time interval.

The shaded bars 404 represent static time intervals during which the noise level is monitored. In the chart 400, the shaded bars 404 indicate that the noise level is monitored each hour. In some examples, the noise level can be monitored at any suitable static time interval based on seconds, minutes, hours, or days, among others.

The solid bars 406 in chart 400 represent the dynamic sampling rate. The dynamic sampling rate may vary depending on the probability that the noise level is to change. For example, the chart 400 depicts a change in noise level around 4:00 AM and 11:00 AM. The indicator module 128 may monitor the noise level more frequently around the times that the noise level is likely to change. In some embodiments, the indicator module 128 may decrease the frequency for monitoring the noise level during time periods in which changes to the noise levels are not likely to occur.

The chart 400 is for illustrative purposes only. The chart 400 can include any suitable frequency for monitoring the noise level within any suitable period of time. For example, the chart 400 may depict the noise level at any time over a period of days, months, or years, among others. Furthermore, the chart 400 can include any suitable number of static time intervals, dynamic sampling rates, or any combination thereof.

Figure 5:
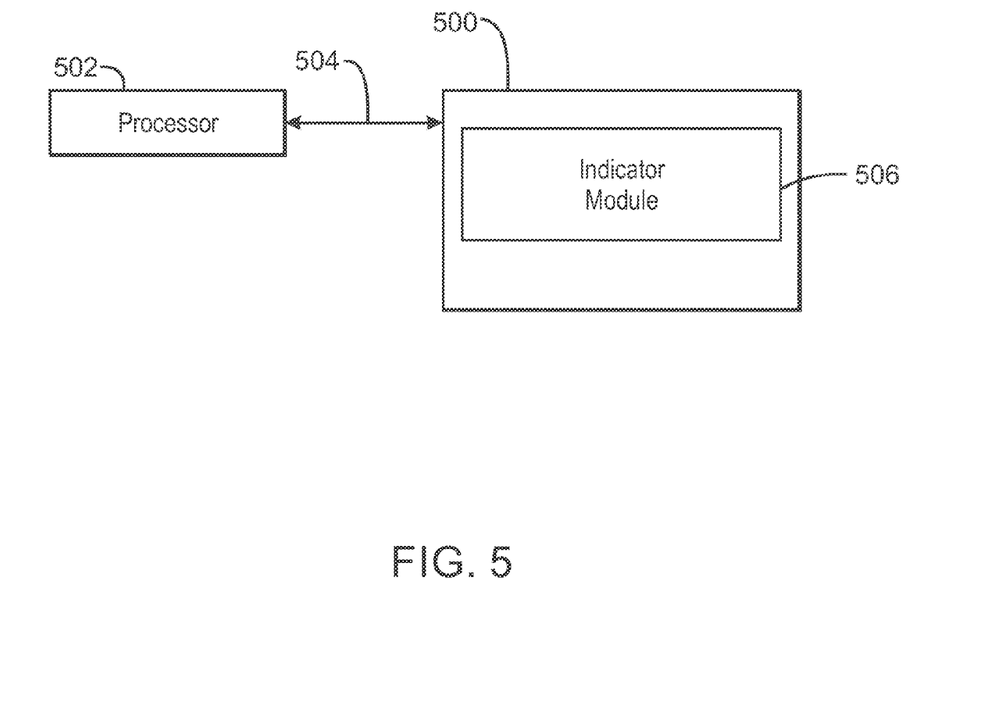
FIG. 5 is a block diagram depicting an example of a tangible, non-transitory computer-readable medium that can modify indicators corresponding to alerts.

FIG. 5 is a block diagram depicting an example of a tangible, non-transitory computer-readable medium that can modify indicators corresponding to alerts. The tangible, non-transitory, computer-readable medium 500 may be accessed by a processor 502 over a computer interconnect 504. Furthermore, the tangible, non-transitory, computer-readable medium 500 may include code to direct the processor 502 to perform the operations of the current method.

The various software components discussed herein may be stored on the tangible, non-transitory, computer-readable medium 500, as indicated in FIG. 5. For example, an indicator module 506 may be adapted to direct the processor 502 to modify an indicator corresponding to an alert. For example, the indicator module 506 may detect an alert and delay an indicator corresponding to the alert until the processor 502 has determined a modified indicator based on the noise level. It is to be understood that any number of additional software components not shown in FIG. 5 may be included within the tangible, non-transitory, computer-readable medium 500, depending on the specific application.

EXAMPLE 1

A method for modifying an indicator corresponding to an alert is described herein. The method can include detecting the alert with a computing device and monitoring a noise level in an environment surrounding the computing device. The method can also include modifying the indicator corresponding to the alert based on the environment noise level. Furthermore, the method can include providing the modified indicator corresponding to the alert.

In some embodiments, the method can monitor the noise level with a microphone, a sensor, or a combination of the microphone and the sensor. In addition, the modified indicator in the method may comprise haptic feedback or audio feedback. In some examples, the method also includes transitioning from a wake state to a sleep state when the computing device is not monitoring the noise level. In some embodiments, the sleep state comprises stopping the flow of power to a processor and the processor cache.

EXAMPLE 2

A computing device for modifying an indicator corresponding to an alert is described herein. The computing device comprises processing logic, the processing logic at least partially implemented in hardware. In some embodiments, the processing logic can detect the alert with the computing device and monitor a noise level in an environment surrounding the computing device. The processing logic can also modify the indicator corresponding to the alert based on the environment noise level. Furthermore, the processing logic can provide the modified indicator corresponding to the alert.

In some embodiments, the processing logic can also determine a dynamic sampling rate to detect the noise level, and monitor the noise level using a time interval based on the dynamic sampling rate. Also, in some examples, the dynamic sampling rate can be based on a change in the observed noise level. Additionally, in some embodiments, the alert can be an incoming call, an email, a user initiated media application, or a notification related to an application.

EXAMPLE 3

A non-transitory, computer-readable medium comprising a plurality of instructions that, in response to being executed on a computing device, cause the computing device to modify an indicator corresponding to an alert is described herein. In some embodiments, the instructions can cause the computing device to detect an alert with a computing device. The instructions can also cause the computing device to determine a dynamic sampling rate to detect a noise level. Additionally, the instructions can cause the computing device to monitor the noise level in an environment surrounding the computing device using a time interval based on the dynamic sampling rate. The instructions can also cause the computing device to modify an indicator corresponding to the alert based on the environment noise level and provide the modified indicator corresponding to the alert.

In some embodiments, the instructions cause the computing device to detect an alert comprising an incoming call, an email, a user initiated media playback or a notification related to an application. In some embodiments, the instructions can also cause the computing device to monitor a noise level with a microphone, a sensor, a combination of microphone and sensor, or any suitable additional hardware components. In some embodiments, the instructions can cause the computing device to provide a modified indicator, wherein the modified indicator comprises haptic feedback and/or audio feedback.

EXAMPLE 4

A system for modifying an indicator corresponding to an alert is also described herein. The system can include at least one noise level monitoring device, and processing logic, the processing logic at least partially implemented in hardware. The processing logic can detect the alert with the system and monitor a noise level in an environment surrounding the system with the at least one noise level monitoring device. The processing logic can also modify the indicator corresponding to the alert based on the noise level, and provide the modified indicator corresponding to the alert. In some embodiments, the at least one noise level monitoring device comprises a microphone, a sensor, or a combination of the microphone and the sensor.

Although an example embodiment of the disclosed subject matter is described with reference to block and flow diagrams in FIGS. 1-5, persons of ordinary skill in the art will readily appreciate that many other methods of implementing the disclosed subject matter may alternatively be used. For example, the order of execution of the blocks in flow diagrams may be changed, and/or some of the blocks in block/flow diagrams described may be changed, eliminated, or combined.

In the preceding description, various aspects of the disclosed subject matter have been described. For purposes of explanation, specific numbers, systems and configurations were set forth in order to provide a thorough understanding of the subject matter. However, it is apparent to one skilled in the art having the benefit of this disclosure that the subject matter may be practiced without the specific details. In other instances, well-known features, components, or modules were omitted, simplified, combined, or split in order not to obscure the disclosed subject matter.

Various embodiments of the disclosed subject matter may be implemented in hardware, firmware, software, or combination thereof, and may be described by reference to or in conjunction with program code, such as instructions, functions, procedures, data structures, logic, application programs, design representations or formats for simulation, emulation, and fabrication of a design, which when accessed by a machine results in the machine performing tasks, defining abstract data types or low-level hardware contexts, or producing a result.

Program code may represent hardware using a hardware description language or another functional description language which essentially provides a model of how designed hardware is expected to perform. Program code may be assembly or machine language or hardware-definition languages, or data that may be compiled and/or interpreted. Furthermore, it is common in the art to speak of software, in one form or another as taking an action or causing a result. Such expressions are merely a shorthand way of stating execution of program code by a processing system which causes a processor to perform an action or produce a result.

Program code may be stored in, for example, volatile and/or non-volatile memory, such as storage devices and/or an associated machine readable or machine accessible medium including solid-state memory, hard-drives, floppy-disks, optical storage, tapes, flash memory, memory sticks, digital video disks, digital versatile discs (DVDs), etc., as well as more exotic mediums such as machine-accessible biological state preserving storage. A machine readable medium may include any tangible mechanism for storing, transmitting, or receiving information in a form readable by a machine, such as antennas, optical fibers, communication interfaces, etc. Program code may be transmitted in the form of packets, serial data, parallel data, etc., and may be used in a compressed or encrypted format.

Program code may be implemented in programs executing on programmable machines such as mobile or stationary computers, personal digital assistants, set top boxes, cellular telephones and pagers, and other electronic devices, each including a processor, volatile and/or non-volatile memory readable by the processor, at least one input device and/or one or more output devices. Program code may be applied to the data entered using the input device to perform the described embodiments and to generate output information. The output information may be applied to one or more output devices. One of ordinary skill in the art may appreciate that embodiments of the disclosed subject matter can be practiced with various computer system configurations, including multiprocessor or multiple-core processor systems, minicomputers, mainframe computers, as well as pervasive or miniature computers or processors that may be embedded into virtually any device. Embodiments of the disclosed subject matter can also be practiced in distributed computing environments where tasks may be performed by remote processing devices that are linked through a communications network.

Although operations may be described as a sequential process, some of the operations may in fact be performed in parallel, concurrently, and/or in a distributed environment, and with program code stored locally and/or remotely for access by single or multi-processor machines. In addition, in some embodiments the order of operations may be rearranged without departing from the spirit of the disclosed subject matter. Program code may be used by or in conjunction with embedded controllers.

While the disclosed subject matter has been described with reference to illustrative embodiments, this description is not intended to be construed in a limiting sense. Various modifications of the illustrative embodiments, as well as other embodiments of the subject matter, which are apparent to persons skilled in the art to which the disclosed subject matter pertains are deemed to lie within the scope of the disclosed subject matter.

What is claimed is:

1. A computing device for modifying an indicator corresponding to an alert comprising:
   processing logic, the processing logic at least partially implemented in hardware, the processing logic to:
      determine a dynamic sampling rate to detect a noise level, the dynamic sampling rate to be based on a mean noise level value or a weighted mean noise level value;
      detect the alert with the computing device;
      delay the indicator corresponding to the detected alert;
      monitor the noise level in an environment surrounding the computing device using a time interval based on the dynamic sampling rate in response to detecting the alert;
      modify the indicator corresponding to the alert based on the noise level; and
      provide the modified indicator corresponding to the alert.

2. The computing device of claim 1, wherein the processing logic is to:
   determine a dynamic sampling rate to detect the noise level; and
   monitor the noise level using a time interval based on the dynamic sampling rate.

3. The computing device of claim 2, wherein the dynamic sampling rate is based on a change in the noise level.

4. The computing device of claim 1, wherein the alert is an incoming call, an email, a user initiated media application, or a notification related to an application.

5. The computing device of claim 1, wherein the noise level is monitored with a microphone, a sensor, or a combination of the microphone and the sensor.

6. The computing device of claim 1, wherein the modified indicator comprises haptic feedback.

7. The computing device of claim 1, wherein the modified indicator comprises audio feedback.

8. A method for modifying an indicator corresponding to an alert comprising:
   determining a dynamic sampling rate to detect a noise level, the dynamic sampling rate to be based on a mean noise level value or a weighted mean noise level value;
   detecting the alert with a computing device;
   delaying the indicator corresponding to the detected alert;
   monitoring the noise level in an environment surrounding the computing device using a time interval based on the dynamic sampling rate in response to detecting the alert;
   modifying the indicator corresponding to the alert based on the noise level; and
   providing the modified indicator corresponding to the alert.

9. The method of claim 8, comprising:
   determining a dynamic sampling rate to detect the noise level; and
   monitoring the noise level using a time interval based on the dynamic sampling rate.

10. The method of claim 9, wherein the dynamic sampling rate is based on a change in the noise level.

11. The method of claim 8, wherein the alert is an incoming call, an email, a user initiated media application, or a notification related to an application.

12. The method of claim 8, wherein the noise level is monitored with a microphone, a sensor, or a combination of the microphone and the sensor.

13. The method of claim 8, wherein the modified indicator comprises haptic feedback.

14. The method of claim 8, wherein the modified indicator comprises audio feedback.

15. The method of claim 8, comprising transitioning from a wake state to a sleep state when the computing device is not monitoring the noise level.

16. The method of claim 15, wherein the sleep state comprises stopping the flow of power to a processor and the processor cache.

17. A non-transitory, computer-readable medium comprising a plurality of instructions that, in response to being executed on a computing device, cause the computing device to:
   detect an alert with a computing device;
   delay an indicator corresponding to the detected alert;
   determine a dynamic sampling rate to detect a noise level, the dynamic sampling rate to be based on a mean noise level value or a weighted mean noise level value;
   monitor the noise level in an environment surrounding the computing device using a time interval based on the dynamic sampling rate in response to detecting the alert, the dynamic sampling rate corresponding to the noise level;
   modify an indicator corresponding to the alert based on the noise level; and
   provide the modified indicator corresponding to the alert.

18. The non-transitory, computer-readable medium of claim 17, wherein the dynamic sampling rate is based on a change in the noise level.

19. The non-transitory, computer-readable medium of claim 17, wherein the alert is an incoming call, an email, a user initiated media playback or a notification related to an application.

20. The non-transitory, computer-readable medium of claim 17, wherein the noise level is monitored with a microphone.

21. The non-transitory, computer-readable medium of claim 17, wherein the modified indicator comprises haptic feedback.

22. The non-transitory, computer-readable medium of claim 17, wherein the modified indicator comprises audio feedback.

23. A system for modifying an indicator corresponding to an alert comprising:
   at least one noise level monitoring device; and
   processing logic, the processing logic at least partially implemented in hardware, the processing logic to:
      determine a dynamic sampling rate to detect a noise level, the dynamic sampling rate to be based on a mean noise level value or a weighted mean noise level value;
      detect the alert with the system;
      delay the indicator corresponding to the detected alert;
      monitor the noise level in an environment surrounding the system with the at least one noise level monitoring device in response to detecting the alert, the noise level to be monitored using a time interval based on the dynamic sampling rate;

modify the indicator corresponding to the alert based on the noise level; and provide the modified indicator corresponding to the alert.

24. The system of claim 23, wherein the at least one noise level monitoring device comprises a microphone, a sensor, or a combination of the microphone and the sensor.

* * * * *